June 24, 1930.  F. D. PARKER  1,766,451

SPRING

Filed Jan 18, 1928

F. D. Parker, INVENTOR

BY Victor J. Evans ATTORNEY

WITNESS:

Patented June 24, 1930

1,766,451

UNITED STATES PATENT OFFICE

FRANCIS D. PARKER, OF LA FARGE, WISCONSIN

SPRING

Application filed January 18, 1928. Serial No. 247,659.

This invention relates to laminated suspension springs for vehicle bodies.

The object of the invention is to provide a spring of great resiliency adapted to give a proper cushioning effect on either smooth or rough roads.

In carrying out the invention I provide a plurality of highly elastic laminated leaves superposed in vertical series and constituted in a plurality of groups the upper group being of progressively decreasing lengths and an adjacent bottom group being of progressively increasing lengths. The whole series is clamped together by a rigid connection and the lower group is provided with a plurality of cushioned clamps symmetrically spaced from the center of the spring. The lower lamina is provided with curled ends to afford a pivot point and suspension support for the spring to the vehicle body. The top lamina one or more is connected at the ends by shackle links to the bottom lamina at points between multiple laminæ to afford a moderate elastic connection adjacent the support for the body. A plurality of vulcanized rubber cushions are provided at the ends of the several laminæ of the lower group thereby affording a cushion and anti-friction support accommodating the relative movement of the adjacent laminæ. Thus I have a very stiff middle section with varying stiffness toward the ends and terminal sections of very much less stiffness responsive to minor jolts.

The several features of novelty of the invention will be more fully described and the scope definitely indicated in the claims appended to this specification.

In the accompanying drawings which illustrate the invention:—

Figure 1:
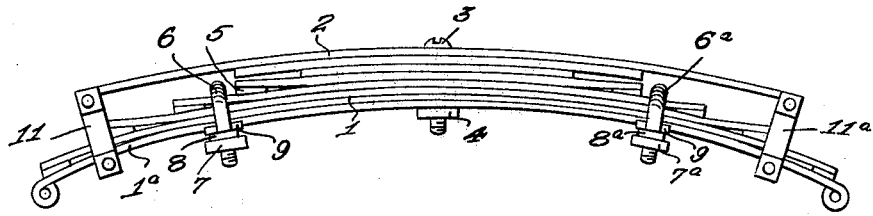
Figure 1 is an elevation of a suspension spring embodying my improvements.
Figure 2:
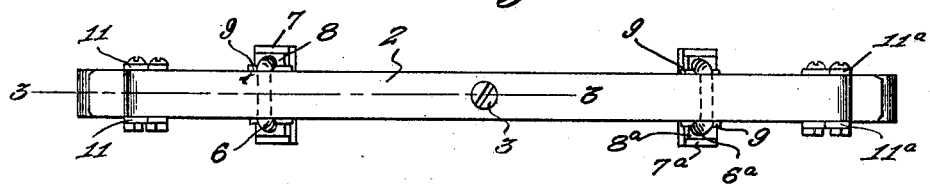
Fig. 2 is a plan.
Figure 3:
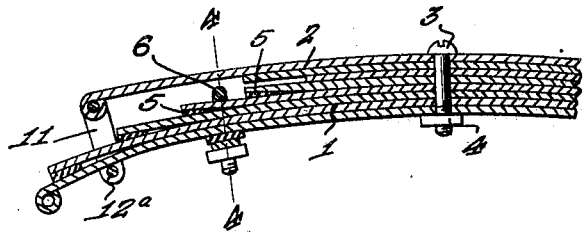
Fig. 3 is a part sectional view longitudinally on the plane 3—3 of Fig. 2.
Figure 4:
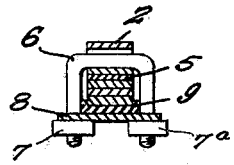
Fig. 4 is a section on the plane 4—4 of Fig. 3.

Referring now in detail to the drawings, 1 and 2 represent a series of groups of steel laminæ preferably firmly clamped at the central point by a screw and nut, 3, 4; the top series are of decreasing lengths shown in this case as three, the lower one of which is considerably shorter in length to afford resilient ends to the upper pair, the third laminæ of this group being shorter in length than the one immediately above it. The adjacent group of laminæ 2 is constituted by a series of progressively increasing lengths having applied beneath their contacting ends spacers preferably of vulcanized rubber as an anti-friction spacer clamped between adjacent laminæ. Adjacent elastic wedges 5 I apply a pair of threaded yokes 6, 6ª clamped by nuts 7, 7ª and cooperating lock nuts 8, 8ª beneath which I insert vulcanized perforated cushions 9, 9ª through which the legs of the yokes pass. The yokes hold together the bottom group of laminæ and make of this group a stiff bottom spring. The cushions compensate for a creeping effect of the several laminæ one on the other under vibration of the spring. The lowest lamina of the compound group is provided with curled edges to form an eye through which may be passed a bolt to connect with lower complementary supports secured to the chassis. At the ends of the laminæ 2 are provided a pair of pivoted shackle links 11, 11ª with a transverse bolt 12ª engaging the lower wall of the lamina 1ª and maintaining a proper relation between the two spring sections. With this construction it will be seen that the tie bolt 3, 4 or several placed apart if desired preserves an invariable relative relation of the several laminæ and that the several spacers permit relative movement of the laminæ, the section of the spring between the clamps 5, 5ª will act as an emergency spring to take care of hard thrusts, and yet will afford an elastic movement while the outer sections beyond the clamps 5, 5ª afford a more sensitive suspension by reason of the shackle and are free to move resiliently under a minor road irregularity. The considerable free lengths of the ends 2ª and 1ª afford an elastic support which conduces to easy riding and prevents violent jolting to the occupants of the vehicle. The several laminæ are preferably made of high carbon tempered steel or other steel containing a small content of chromium which is suitable for resisting a greater length of service without weakening by crystallization. A spring designed as above described promotes easy riding qualifications both for smooth and rough roads.

Having thus described my invention, what I claim as new and desire to secure by Letters Patent is:—

A suspension spring for a vehicle body comprising a series of superposed resilient laminæ in a plurality of groups, the first group comprising a series of laminæ of progressively shorter lengths, an adjacent group of progressively longer laminæ, elastic wedges disposed beneath the ends of the shorter laminæ, a plurality of spaced clamps uniformly distributed longitudinally of the groups between the spring ends adjacent the wedges, flat cushions under the clamp nuts, and a pair of eyes at the ends of the spring adapted to form a support for the body.

In testimony whereof I affix my signature.

FRANCIS D. PARKER.